(12) United States Patent
Hoffmann et al.

(10) Patent No.: US 9,181,873 B2
(45) Date of Patent: Nov. 10, 2015

(54) GAS TURBINE WITH FLOW SEPARATION AND RECIRCULATION

(75) Inventors: Jürgen Hoffmann, Untersiggenthal (CH); Hans Peter Knopfel, Dottikon (CH); Hans E. Wettstein, Fislisbach (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 257 days.

(21) Appl. No.: 13/186,867

(22) Filed: Jul. 20, 2011

(65) Prior Publication Data

US 2012/0031101 A1 Feb. 9, 2012

Related U.S. Application Data

(63) Continuation of application No. PCT/EP2010/050606, filed on Jan. 20, 2010.

(30) Foreign Application Priority Data

Jan. 23, 2009 (CH) ..................... 0105/09

(51) Int. Cl.
  *F02C 6/18* (2006.01)
  *F01D 17/14* (2006.01)
  (Continued)

(52) U.S. Cl.
  CPC ............. *F02C 6/18* (2013.01); *F01D 17/141* (2013.01); *F01K 23/10* (2013.01); *F02C 3/34* (2013.01);
  (Continued)

(58) Field of Classification Search
  CPC ............ F02C 1/08; F02C 1/10; F02C 1/105;
  F02C 3/34; F02C 6/18; F05D 2220/72;
  F23C 2202/30; F01K 23/06; F01K 23/10;
  Y02E 20/16; Y02E 20/185; Y02E 20/32;
  Y02E 20/326
  USPC .......... 60/783, 772, 39.182, 39.52, 39.5, 791, 60/774
  See application file for complete search history.

(56) References Cited

U.S. PATENT DOCUMENTS 3,736,070 A * 5/1973 Moskowitz et al. ........... 415/147
4,049,299 A * 9/1977 Rigollot .......................... 290/52
(Continued)

FOREIGN PATENT DOCUMENTS

EP 0620362 A1 10/1994
EP 1918014 A1 5/2008
(Continued)

OTHER PUBLICATIONS

Balland, O. and Saether, S. "New Concepts for Natural Gas Fired Power Plants Which Simplify the Recovery of Carbon Dioxide" Engergy Convers. Mgmt. vol. 33, No. 5-8, pp. 467-475, 1992.

*Primary Examiner* — Phutthiwat Wongwian
*Assistant Examiner* — Vikansha Dwivedi
(74) *Attorney, Agent, or Firm* — Buchanan Ingersoll & Rooney PC

(57) ABSTRACT

A method is provided for $CO_2$ separation from a combined-cycle power plant with exhaust-gas recirculation and $CO_2$ separation. The hot-gas flow is split into a recirculation flow and an exhaust-gas flow before the final turbine stage in the turbine. A first partial flow remains in the turbine and carries out expansion work in the conventional form, before its waste heat is dissipated, for example in a waste-heat boiler, and the gases are recirculated into the inlet flow of the gas turbine. A second partial flow is diverted before the final turbine stage, and emits its waste heat in an HRSG/heat exchanger, before $CO_2$ is separated from the exhaust-gas flow at an increased pressure level.

21 Claims, 9 Drawing Sheets

(51) Int. Cl.
    *F01K 23/10*     (2006.01)
    *F02C 3/34*     (2006.01)
    *B01D 53/047*     (2006.01)
    *B01D 53/77*     (2006.01)

(52) U.S. Cl.
    CPC ............... *B01D 53/047* (2013.01); *B01D 53/77* (2013.01); *B01D 2257/504* (2013.01); *Y02C 10/06* (2013.01); *Y02E 20/14* (2013.01); *Y02E 20/16* (2013.01)

(56) References Cited

U.S. PATENT DOCUMENTS

| | | | |
|---|---|---|---|
| 4,388,808 A * | 6/1983 | Durenec | 62/6 |
| 4,598,543 A * | 7/1986 | Brewer | 60/791 |
| 4,751,814 A * | 6/1988 | Farrell | 60/39.183 |
| 5,454,220 A | 10/1995 | Althaus et al. | |
| 6,237,395 B1 * | 5/2001 | Helgeson | 73/23.31 |
| 6,260,348 B1 * | 7/2001 | Sugishita et al. | 60/39.12 |
| 6,637,183 B2 * | 10/2003 | Viteri et al. | 60/39.182 |
| 2002/0189443 A1 * | 12/2002 | McGuire | 95/32 |
| 2003/0131582 A1 | 7/2003 | Anderson et al. | |
| 2005/0022499 A1 * | 2/2005 | Belokon et al. | 60/39.511 |
| 2007/0248527 A1 | 10/2007 | Spencer | |
| 2008/0010967 A1 * | 1/2008 | Griffin et al. | 60/39.182 |
| 2008/0011160 A1 | 1/2008 | Bowman et al. | |
| 2008/0060346 A1 * | 3/2008 | Asen et al. | 60/274 |
| 2009/0173073 A1 | 7/2009 | Guidati et al. | |

FOREIGN PATENT DOCUMENTS

| | | |
|---|---|---|
| WO | 0048709 A1 | 8/2000 |
| WO | 2004072443 A1 | 8/2004 |
| WO | 2008017577 A1 | 2/2008 |

* cited by examiner

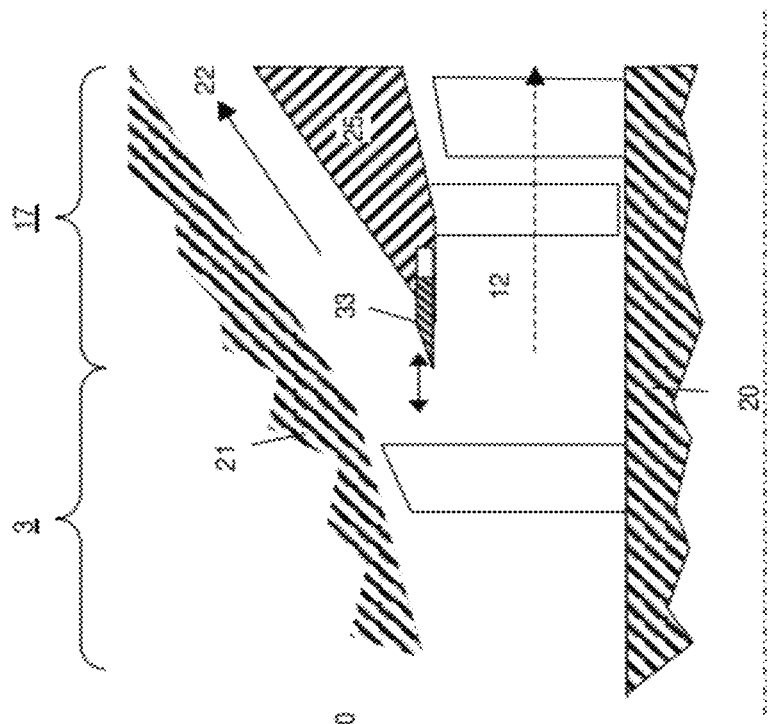
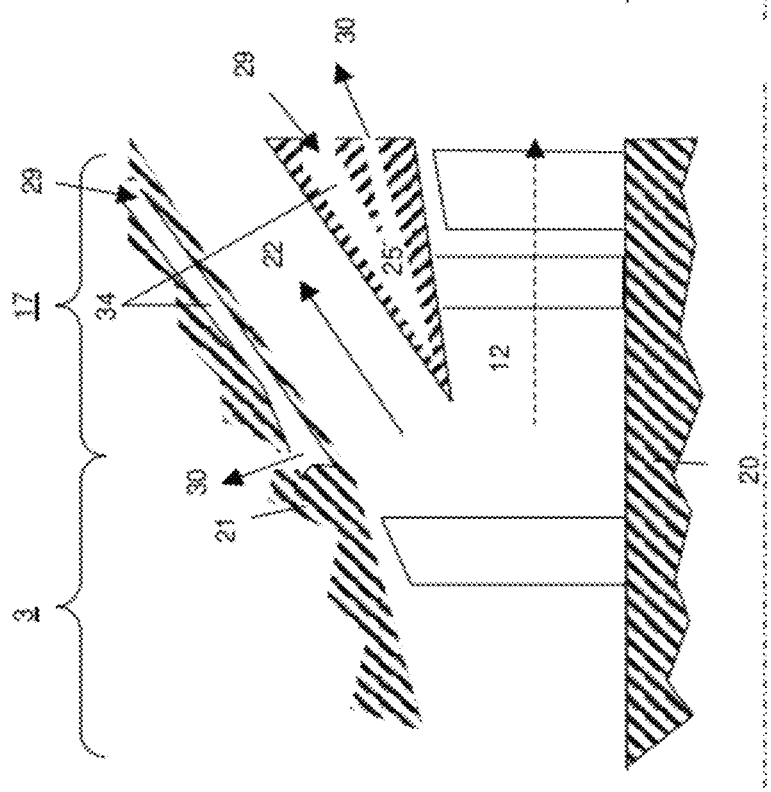

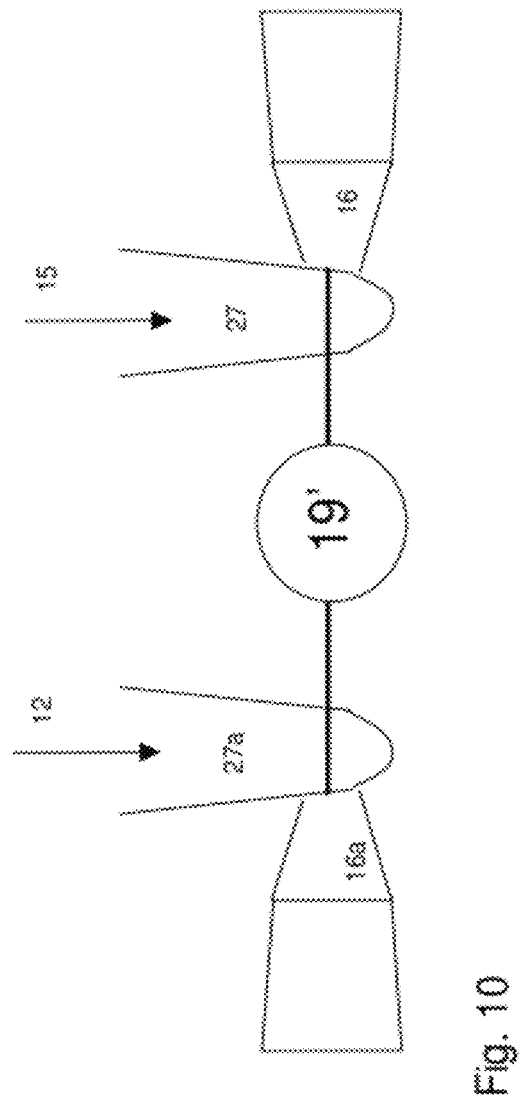

US 9,181,873 B2

GAS TURBINE WITH FLOW SEPARATION AND RECIRCULATION

CROSS REFERENCE TO RELATED APPLICATION

This application is a continuation of International Application No. PCT/EP2010/050606 filed Jan. 20, 2010, which claims priority to Swiss Patent Application No. 00105/09, filed Jan. 23, 2009, the entire contents of all of which are incorporated by reference as if fully set forth.

FIELD OF INVENTION

The invention relates to a method for operation of a combined-cycle power plant with $CO_2$ separation, and to such a power plant.

BACKGROUND

Because of the generally recognized risk of climate change, there is worldwide interest in reducing the emission of greenhouse gases, in particular of $CO_2$ (carbon dioxide). So-called CCS (carbon capture and storage) or $CO_2$ sequestration, that is to say the separation of the $CO_2$ from the thermal power process in a power plant and storage of the separated $CO_2$ separately from the atmosphere, is considered to be a realistic step for reducing the $CO_2$ emission into the atmosphere within a relatively short time. $CO_2$ separation is carried out either from the flue gases after the combustion of a fuel containing carbon or by a chemical reaction, in which the carbon is separated from the fuel before combustion. The CCS process includes regeneration of absorbers, adsorbers, or other $CO_2$ separators.

Separation of $CO_2$ after combustion, also referred to as backend capture or post combustion capture, is one of the most promising CCS technologies, and can also be used in particular for combined-cycle power plants.

All known CCS technologies require a relatively large amount of power. In the case of backend capture, the specific energy consumption per kilogram of separated $CO_2$ is inversely proportional to the $CO_2$ concentration in the flue gases from which the $CO_2$ is separated. In order to separate $CO_2$ from gas flows with a relatively low $CO_2$ content, as is the case in the flue gas from conventional gas turbine power plants or combined-cycle power plants (or gas turbine power plants with power/heat coupling), a relatively large amount of energy is correspondingly required per kilogram of separated $CO_2$. The $CO_2$ content of the flue gases depends on the nature of the gas turbine, the fuel gas used and the operating point of the gas turbine. Various concepts have been proposed to increase the $CO_2$ concentration in the flue gases, and therefore to increase the efficiency of the separation process. One concept is flue gas recirculation, for example as has been proposed by O. Bolland and S. Sæther in "NEW CONCEPTS OF NATURAL GAS FIRED POWER PLANTS WHICH SIMPLIFY THE RECOVERY OF CARBON DIOXIDE" (Energy Conyers. Mgmt Vol. 33, No. 5-8, pp. 467-475, 1992). Another concept is the series connection of CCPP, as has been proposed, for example, in US2008/0060346. In this case, the flue gases from a first CCPP are cooled down, and are used as inlet gases for a second CCPP. The flue gases from the second CCPP are cooled and are then passed on for $CO_2$ separation. This virtually doubles the $CO_2$ content of the flue gases, halves the total mass flow of flue gas to be treated, and correspondingly reduces the required plant size and energy consumption.

Furthermore, it has already been proposed in the past for the $CO_2$ absorption to be carried out at an increased pressure. Because of the reduced volume flows, this makes it possible to reduce the plant size and to exploit an increased capacity of the absorber at an increased pressure. For this purpose, WO 00/48709 proposes re-compression of the flue gases for absorption, with subsequent heating and expansion in a turbine. Since the energy for $CO_2$ absorption at high pressure is inversely proportional to the $CO_2$ partial pressure, the energy consumption resulting from absorption at an increased pressure could ideally lead to an efficiency improvement. Since the additional compression results in unavoidable losses, at least some part of the positive effect is, however, lost.

SUMMARY

The present disclosure is directed to a method for $CO_2$ separation from a combined-cycle power plant. The method includes splitting a gas flow, expanded in a gas turbine, after a high-pressure turbine. The method also includes expanding further a first partial mass flow, its waste heat is dissipated in a usable form, and recirculating the first partial mass flow into an inlet flow of the gas turbine. The method also includes diverting a second partial mass flow, as an extraction flow; cooling the second partial mass flow; and separating $CO_2$ from it.

In another aspect, the present disclosure is directed to a combined-cycle power plant, with $CO_2$ separation. The plant includes at least one gas turbine, which includes at least one compressor, at least one combustion chamber and at least one turbine. The turbine, which is arranged downstream from a last combustion chamber in the gas turbine, has flow splitting after a high-pressure turbine, in order to split the gases flowing through the turbine into an extraction flow and a recirculation flow into an inlet flow of the compressor.

BRIEF DESCRIPTION OF THE DRAWINGS

The invention is illustrated schematically in the exemplary embodiments shown in FIGS. 1 to 11, in which:

FIG. 8 shows a section through a turbine with a flow splitter before the final turbine stage, and steam cooling of the stator blade carrier in the area of the extraction flow.

FIG. 9 shows a section through a turbine with a flow splitter and an adjusting ring for regulating the extraction flow.

FIG. 10 shows a single-shaft arrangement with in each case one low-pressure turbine for recirculation and an air turbine for expansion of the $CO_2$-depleted exhaust gases.

DETAILED DESCRIPTION OF THE PREFERRED EMBODIMENTS

Introduction to the Embodiments

Figure 1:
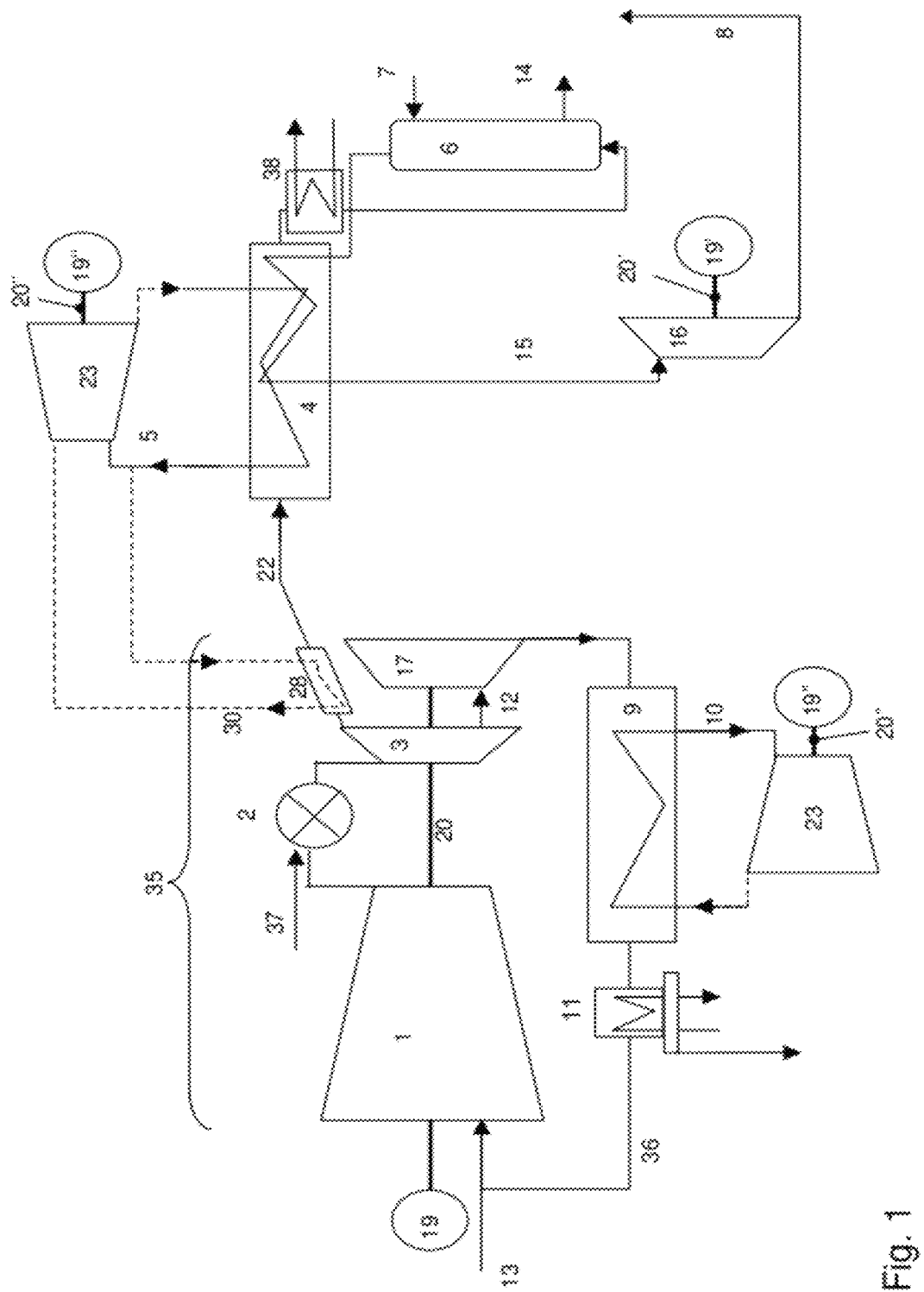
FIG. 1 shows a CCPP with a steam-cooled flow splitter in a single-shaft gas turbine, recirculation of a partial flue gas flow and extraction of a second partial flue-gas flow for backend capture with optimized steam generation.

The object of the present invention is to propose a method for optimized overall-efficiency operation of a combined-cycle power plant with $CO_2$ separation, which allows the $CO_2$ absorption plant to have a small physical size and to propose a power plant for carrying out this method. In this case, a CCPP (combined cycle power plant), also referred to in German as GUD (Gas and steam-combined-cycle power plant) is mentioned as a combined-cycle power plant, or some other power plant based on a gas turbine with power/heat coupling.

According to the invention, a method is provided for $CO_2$ separation from a combined-cycle power plant with flue gas recirculation into the inlet flow of a gas turbine, in which $CO_2$ is separated from a diverted flue gas flow. In the proposed new method, the hot-gas flow in the gas turbine is split into two partial flows downstream from the high-pressure turbine. A first partial flow, the recirculation flow, carries out expansion work in the conventional manner, before its waste heat can be used, for example in a waste-heat boiler, (referred to in the following text as an HRSG), is diverted and the gases are recirculated into the inlet flow of the gas turbine. A second partial flow, the flue gas flow, is diverted downstream from the high-pressure turbine and is cooled, for example by heat emission in an HRSG/heat exchanger, before $CO_2$ is separated from this flue gas flow at an increased pressure level.

This method has the advantage that the $CO_2$ separation is carried out at an increased pressure level without any need for recompression of the flue gases. Since the flue gas volume flows become less as the pressure rises, this allows $CO_2$ separation to be carried out in a smaller physical size. Furthermore, losses resulting from expansion and subsequent decompression are avoided, thus improving the overall efficiency.

Depending on the pressure level of the flue gases after the $CO_2$ separation, they are either expanded in an air turbine with power being output, or are reheated in the HRSG/heat exchanger, and are then expanded in an air turbine with power being output. Direct expansion or direct emission of the flue gases to the surrounding area is also possible.

In one embodiment, $CO_2$ is separated from the flue gas by cryogenic separation. The proposed cryogenic separating apparatus is a swirl nozzle through which the gas flow to be treated flows. The gas is accelerated to a major extent in this swirl nozzle, and is thus cooled down. With sufficient precooling, the temperature in the swirl nozzle falls below the sublimation temperature of $CO_2$, and the $CO_2$ is precipitated. Because of the major swirl in the swirl nozzle, the sublimed $CO_2$ is concentrated by centrifugal forces on the outer walls of the nozzle, and is separated from there. By way of example, such a swirl nozzle is described in U.S. Pat. No. 7,985,278, which is incorporated by reference in its entirety. Suitable precooling typically cools the gas flow to temperatures between −40° C. and −60° C. The precooling temperature can be set depending on the swirl nozzle and the available pressure gradient; ranges between −30° C. and −70° C. are feasible. The pressure after the swirl nozzle is reduced considerably, because of the pressure loss in the swirl nozzle.

In embodiments of the invention in which the outlet pressure after $CO_2$ separation is above the ambient pressure, useful expansion can be provided in a downstream turbine. In one embodiment, the pressure ratios are chosen such that the pressure after the swirl nozzle is virtually the ambient pressure or the ambient pressure plus the pressure losses in downstream flue gas lines.

For the purposes of this disclosure, a high-pressure turbine is that part of a turbine which is located downstream from a combustion chamber and upstream of the splitting of the hot-gas flow. In this case, the turbine may be a single-shaft or multi shaft turbine. That part of the turbine which is located downstream from the splitting of the hot-gas flow is referred to as the low-pressure turbine. It may be part of a single-shaft turbine, may be the power turbine of a multishaft turbine, or may be a separate air turbine.

In one embodiment, the hot gases are expanded in a single-shaft turbine.

In a further embodiment of the invention, the hot gases are expanded in a multishaft gas turbine. This multishaft turbine consists of a core turbine, also referred to as a gas generator, having a compressor and turbine arranged on at least one shaft and having at least one combustion chamber as well as a downstream power turbine on a separate shaft.

Multishaft gas turbines are known, for example, for relatively small industrial gas turbines or so-called aero-derivatives. According to the invention, in this case, the gas flow is split between the core turbine and the power turbine, and the work power turbine is modified in order to match it to the reduced flue gas flow, which is recirculated. This reduced first partial flow carries out expansion work in the conventional manner, before its waste heat is used further in an HRSG, and the flue gases are recirculated into the inlet flow of the gas turbine. A second partial flow is diverted before the final turbine stage, and emits its waste heat in an HRSG/heat exchanger, before $CO_2$ is separated from this flue gas flow at an increased pressure level. Depending on the pressure level of the flue gases after $CO_2$ separation, the flue gases are reheated in the HRSG/heat exchanger, and are expanded in an air turbine with power being produced.

In yet another embodiment, the gas turbine is in the form of a core turbine in which all of the hot gases are expanded to an increased pressure level rather than to ambient pressure, as a result of which the turbine drives the compressor and no work is emitted to the exterior. The hot outlet gases from this core turbine are split into two flows. A first partial flow is expanded via a power turbine, is supplied to an HRSG and, after cooling down, is recirculated into the inlet flow of the gas turbine. The second partial flow is passed through an HRSG/heat exchanger before $CO_2$ is separated from this gas mass flow at an increased pressure level. Depending on the pressure level of the flue gases after $CO_2$ separation, the gases are reheated in the HRSG/heat exchanger and are expanded in an air turbine with power being output, without been expanded with reheating in a turbine, or being emitted directly to the environment.

In embodiments with $CO_2$ separation by absorption or adsorption, the $CO_2$-depleted flue gases are available at an increased pressure level, and they are typically expanded in a downstream turbine, in a useful form.

These arrangements have the advantage that the pressure of the gases from which $CO_2$ is separated is considerably greater than ambient, thus making it possible to reduce the plant size for $CO_2$ separation since, to a first approximation, this is inversely proportional to the pressure.

If the resorption is likewise carried out at increased pressure, the compression work for transport and disposal of the $CO_2$ is also considerably reduced.

Furthermore, this makes it possible for absorption or adsorption to be carried out at an increased pressure, and for resorption and degassing to be carried out at ambient pressure. Only the liquid absorber or adsorber need be compressed for this purpose, with relatively little energy being consumed, the absorption or adsorption process is carried out, and the liquid enriched with $CO_2$ is then expanded. The resorption or degassing can therefore be carried out with relatively little energy being consumed, although the $CO_2$ is released at a lower pressure level.

The lines, diffusers, plena and other components for guidance of the hot gases after the gas generator are, in one embodiment, at least partially designed to be cooled. In particular, it is proposed that these components be cooled with steam. This steam cooling is integrated in the steam circuit, and the fresh steam is thus superheated further. The integration in the steam circuit allows the fresh steam temperature to be raised considerably above that of a conventional gas turbine combined-cycle power plant, and allows the efficiency of the steam circuit to be increased.

A variable geometry is proposed in at least one of the flow paths in order to control the proportion of the recirculation flow with respect to the total mass flow through the gas turbine. For example, the geometry of the flow splitter may be variably adjustable. Furthermore, for example, at least one row of vanes in the low-pressure turbine or air turbine may be variably adjustable.

The diversion of the flue gases for $CO_2$ separation at an increased temperature from the turbine avoids expansion followed by compression. Losses in the turbine and compressor are therefore likewise avoided.

In a further embodiment, the method is proposed for a combined-cycle power plant having a gas turbine with sequential combustion. Conventional gas turbines with sequential combustion are known, for example, from U.S. Pat. No. 5,454,220, which is incorporated by reference as if fully set forth. A gas turbine such as this has at least one compressor, which is followed by a first combustion chamber and a first turbine. The flue gas flow from the first turbine is reheated in a second combustion chamber, before being expanded further in a second turbine.

In the proposed new method, the hot-gas flow is split in the second turbine. A first partial flow remains in the second turbine and carries out expansion work, emits its useable heat in an HRSG, and is recirculated. A second partial flow is diverted before the final turbine stage of the second turbine and emits its useable heat in an HRSG/heat exchanger, before it is fed on for $CO_2$ separation. Further methods for use of the $CO_2$-depleted flue gases with or without reheating and expansion will be evident to a person skilled in the art from the statements relating to gas turbines with a single combustion chamber.

In addition to the method, the subject matter of the invention covers a power plant installation for optimized $CO_2$ separation, having at least one hot-gas extraction in a turbine, flue gases being fed back into the compressor inlet air, and the separation plant for $CO_2$ separation from the diverted hot gases.

One embodiment is a combined-cycle power plant with flow diversion between the high-pressure and low-pressure turbine of the gas turbine. In this case, the high-pressure and low-pressure turbines are each in the form of a turbine having at least one stage. Like all the other embodiments, this embodiment has an apparatus for cooling and waste-heat use of the gas flow to be recirculated, an apparatus for cooling and waste-heat use of the diverted flue gas flow, and an apparatus for separation of $CO_2$ from the diverted flue gas flow.

Further advantages and refinements of the invention are described in the dependent claims and will become evident from the description and the attached drawings. All the explained advantages can be used not only in the respectively stated combinations but also in other combinations or on their own without departing from the scope of the invention.

By way of example, one embodiment is distinguished by a high pressure ratio, in order to reduce the temperature level in the extraction. A pressure ratio of 20 or more, in particular of more than 30, is advantageous in order to produce an uncooled extraction using low-cost materials. In the case of gas turbines with sequential combustion, the pressure ratio may, for example, be increased even further in order that a sufficiently high pressure ratio to reduce the temperature level in the extraction can also be achieved via the second turbine.

Furthermore, a compressor with intermediate cooling is proposed, corresponding to the high pressure ratio.

Furthermore, fuel gas preheating with low-temperature heat from the power plant is a possible way to increase the overall efficiency of the plant.

Analogously, low-temperature heat can also usefully be used for regeneration of the $CO_2$ absorber or adsorber. In addition to known sources from the various steam circuits of the plant, heat from cooling air coolers of the gas turbine can also be used for this purpose.

Furthermore, the gas turbine can be provided with closed or open steam cooling for the combustion chamber and/or the turbine. The heat emitted via the closed steam cooling can be used in the steam circuits to generate electrical energy via the steam turbines and/or as process heat. The cooling systems are for this purpose closed or at least partially closed circuits.

DETAILED DESCRIPTION

FIG. 1 shows a CCPP for carrying out the method according to the invention. This consists of a gas turbine plant which, in a manner known per se, comprises a compressor 1, a combustion chamber 2, a turbine and a generator 19. The generator 19 is typically coupled to the cold end of the gas turbine 35, that is to say to the compressor 1. The turbine is split into a high-pressure turbine 3 and a low-pressure turbine 17. The turbine drives the compressor 1 and the generator 19 via a shaft 20.

The fuel 37, gas or oil, is mixed with gases compressed in the compressor 1, and is burned in the combustion chamber 2. The hot gases are expanded in the at least one downstream turbine, with work being carried out. According to the invention, a first portion of the hot gases is diverted as an extraction flow 22 downstream from the high-pressure turbine 3, and a second part is expanded in the low-pressure turbine 17 with power being output, and is recirculated after emission of the useable heat and cooling down.

In order to feed back the cooled-down recirculation flow 36 and to mix the cooled-down recirculation flow 36 with the induction air 13, the CCPP has a feedback line, an HRSG 9 and a cooler with a condensation separator 11. The fresh steam 10 of the HRSG 9 is used for power output to a steam turbine 23 for, carrying out work, for power/heat coupling, also referred to as cogeneration. The steam turbine 23 in the illustrated example drives a generator 19" via a shaft 20". The HRSG 9 with the steam circuit is illustrated in a highly simplified form. The condenser, feed water pumps and known components of the steam circuit are not illustrated, for simplicity reasons. The steam circuit is typically in the form of a multi-pressure circuit.

The second partial flow that is diverted is cooled as an extraction flow 22 in an HRSG/heat exchanger 4, and is then passed through a $CO_2$ absorber 6. A cooler 38 is typically also arranged downstream from the HRSG/heat exchanger 4 and cools the extraction flow 22 to a temperature level which is suitable for effective absorption. The $CO_2$-depleted exhaust gases are then reheated in the HRSG/heat exchanger 4, and the $CO_2$-depleted pressurized exhaust gases 15 are expanded in the air turbine 16, with power being output, before they are emitted to the environment as the $CO_2$-depleted exhaust gas 8. The air turbine 16 drives a generator 19' via a shaft 20'.

By way of example, the low-temperature heat which is emitted in the cooler 38 can be used for feed-water preheating in one of the steam processes, and/or for preheating of the fuel gas 37.

When the extraction flow 22 is cooled in the HRSG/heat exchanger 4, steam is generated, which emits power in a steam turbine 23 of a steam circuit. In this example, the power is transmitted to a generator 19" via a shaft 20". This steam or a further steam flow is superheated in a steam-cooled diffuser 28 and/or lines through which the extraction flow 22 is diverted from the turbine. Further components of the steam circuit, such as auxiliary systems, condenser and feed water pumps, are not illustrated here or in the following figures, for simplicity reasons.

The HRSG/heat exchanger 4 can be manufactured as one component which integrates both functions, or may consist of two components arranged in series. The HRSG/heat exchanger 4 shown in FIG. 1 is designed for high steam production and a high steam temperature. The heat exchanger part, which reheats the $CO_2$-depleted pressurized exhaust gases for expansion 15, is restricted to the cooler, downstream part of the HRSG/heat exchanger 4. In this example, more than 50% of the useable waste heat is output for steam production.

In principle, various techniques can be used for $CO_2$ separation, such as pressure-change absorption, chemical adsorption, absorption or membrane separation. The regeneration of a $CO_2$-saturated absorber 14, by means of which a $CO_2$ absorption fluid 7 is made available to the $CO_2$ absorber 6, is likewise known per se, and is not illustrated here.

Figure 2:
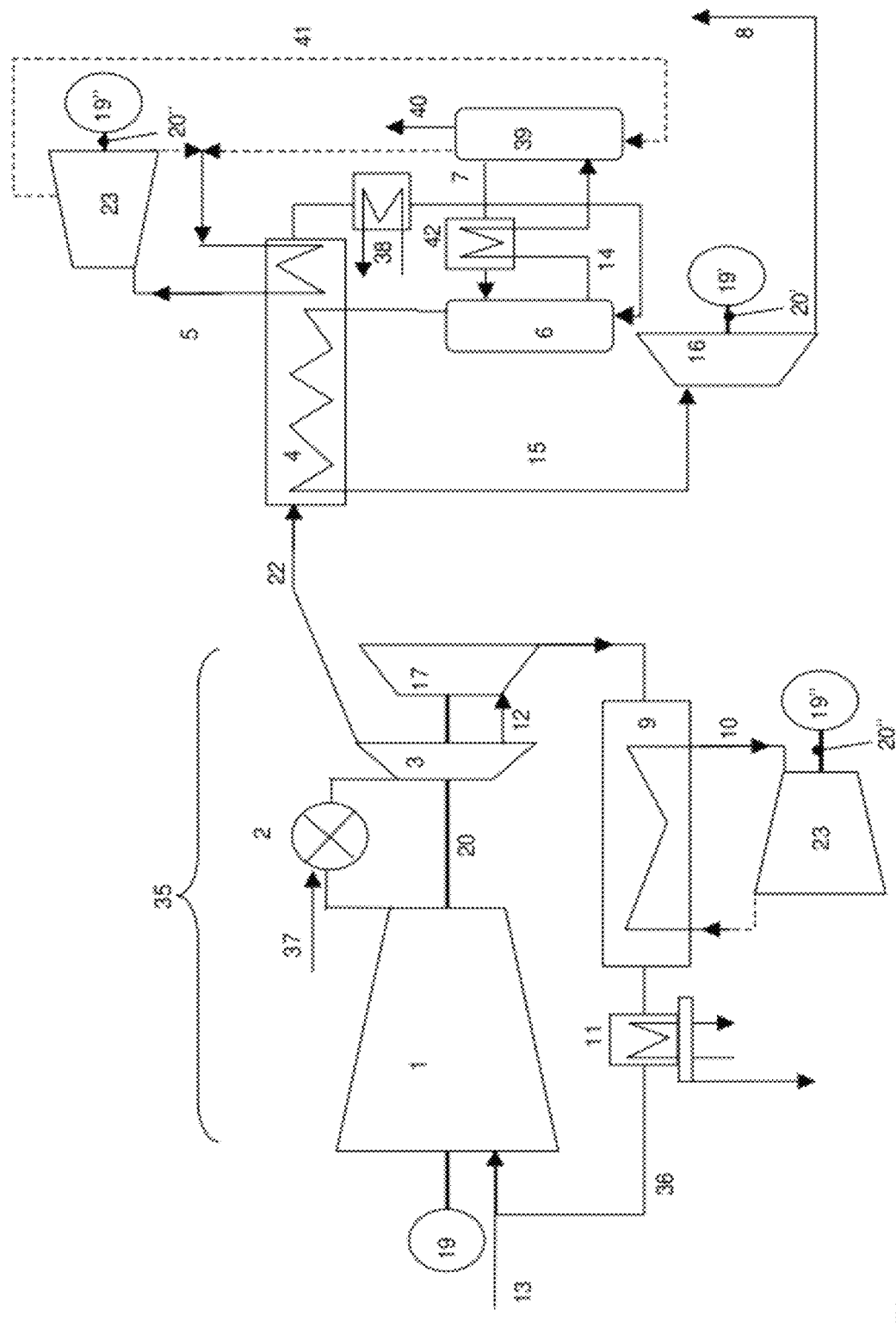
FIG. 2 shows a CCPP with a flow splitter in a single-shaft gas turbine, recirculation of a partial exhaust-gas flow and extraction of a second partial exhaust-gas flow for backend capture with reheating optimized for reexpansion of the exhaust gases.

FIG. 2 likewise shows a CCPP with flow splitting in a single-shaft gas turbine, recirculation of a partial exhaust-gas flow and backend capture from a second partial exhaust-gas flow. This CCPP is optimized for reheating for reexpansion of the exhaust gases. According to the invention, in this case as well, a first portion of the hot gases is diverted as an extraction flow 22 downstream from the high-pressure turbine 3, and a second part is expanded in the low-pressure turbine 17, with power being output, and is recirculated after heat emission and cooling.

In contrast to FIG. 1, in this case there is no steam cooling of the diffuser and of the lines which carry the extraction flow 22 to the HRSG/heat exchanger 4.

Furthermore, the HRSG/heat exchanger 4 is designed for a high heat exchanger power, and only a small amount of fresh steam or hot steam is produced for the steam turbine/cogeneration 5. More than 50% of the heat is in this example used to reheat the $CO_2$-depleted exhaust gases.

In addition, FIG. 2 also shows a desorption column 39 in which the $CO_2$-saturated absorber 14 is regenerated, and which supplies the $CO_2$ absorption fluid 7 to the $CO_2$ absorber 6. For regeneration, the $CO_2$-saturated absorber 7 is preheated in a heat exchanger 42 by regenerated absorber 7. Furthermore, the desorption column 39 is supplied with steam 41 as a heat source for resorption. By way of example, this is extracted from the steam turbine 23. Furthermore, residual heat from the $CO_2$-depleted exhaust gas 8 or other low-temperature heat from the process can be used.

One advantageous feature of this arrangement and process control is that the resorption is carried out under pressure, and $CO_2$ 40 therefore emerges from the resorption column 39 at an increased pressure. The pressure ratio with which the $CO_2$ must be compressed for further transport or storage is correspondingly less, and the required compression work is reduced.

The exhaust-gas temperature downstream from the air turbine 16 can in this embodiment be sufficiently high that a further HRSG 9 can use the remaining residual heat from the $CO_2$-depleted exhaust gases 8 for steam generation as well (not shown in this example).

Figure 3:
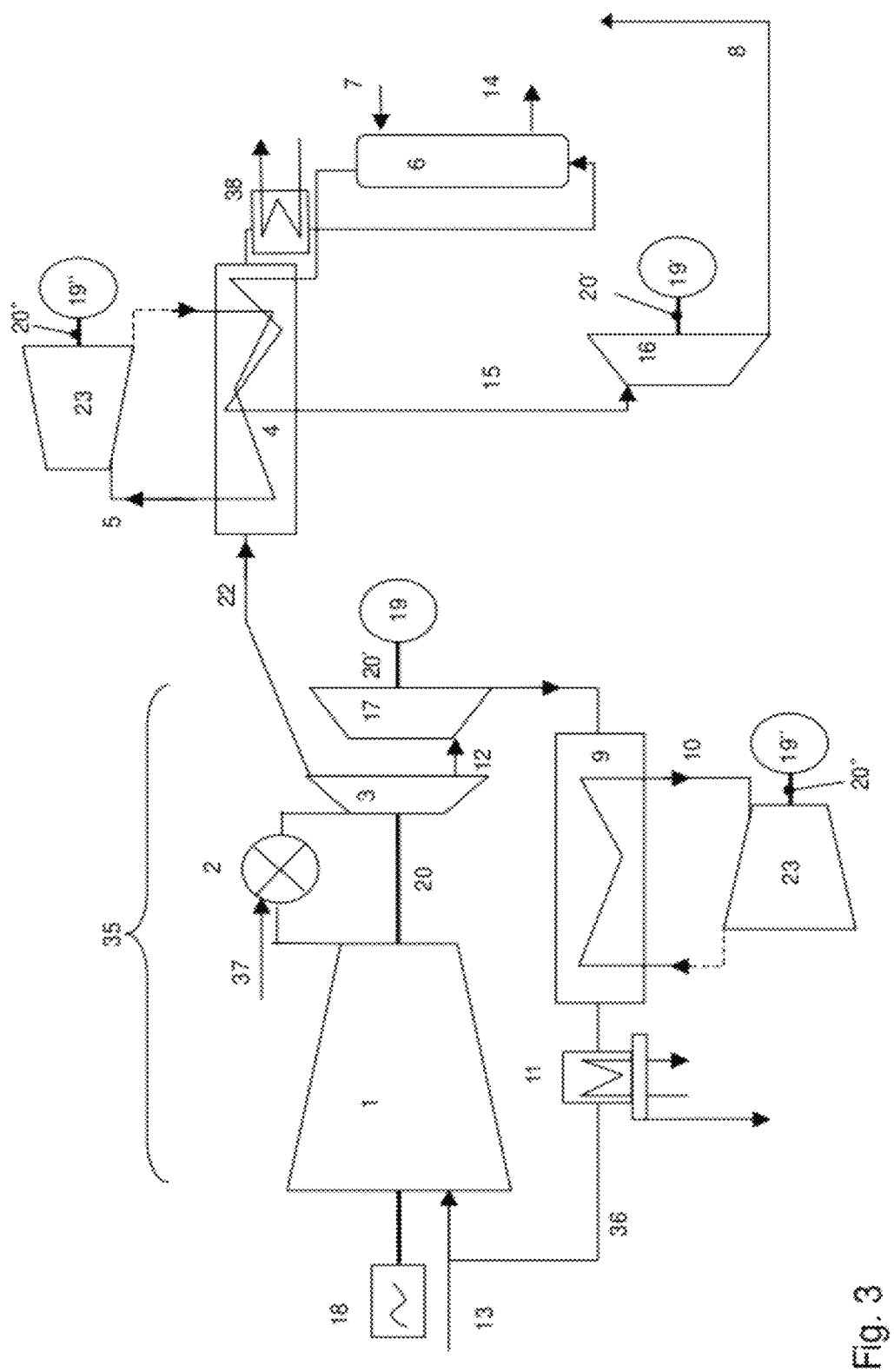
FIG. 3 shows a CCPP with a flow splitter in a two-shaft gas turbine, recirculation of a partial exhaust-gas flow and extraction of a second partial exhaust-gas flow for backend capture with optimized steam generation.

FIG. 3 shows a CCPP with flow splitting in a two-shaft gas turbine, recirculation of a partial exhaust-gas flow, and backend capture from a second partial exhaust-gas flow. The process control with flow splitting, recirculation of a partial exhaust-gas flow and backend capture, optimized reheating for reexpansion of a second partial exhaust-gas flow correspond to those in FIG. 1. In this case, however, the gas turbine is not a single-shaft machine, but a two-shaft machine. The high-pressure turbine 3 is arranged together with the compressor 1 on one shaft 20. This drives only the compressor 1 and, together with it and the combustion chamber 2, forms a so-called gas generator or the core turbine. According to the invention, in this case as well, a first portion of the hot gases is diverted downstream from the high-pressure turbine 3 as an extraction flow 22, and a second portion is expanded in the low-pressure turbine 17, with power being output, and is recirculated after heat emission and cooling. The low-pressure turbine 17 is arranged as a power turbine on a separate shaft 20' and drives the generator 19, which is directly coupled to it.

This arrangement is particularly suitable for plants used as the basis for so-called aero-derivatives or multishaft gas turbines. The required design changes to the core turbine can thus be minimized. The main change is a new low-pressure turbine 17, which should be designed for the mass flow element, reduced by the extraction flow 22, the extraction line and any adaptations to the at least one combustion chamber 2.

In this arrangement, a separate motor 18 is provided as a starting apparatus in order to start the gas turbine, and, as illustrated, is connected to the shaft 20. By way of example, however, it can also be connected to the shaft 20 via a takeover clutch.

Figure 4:
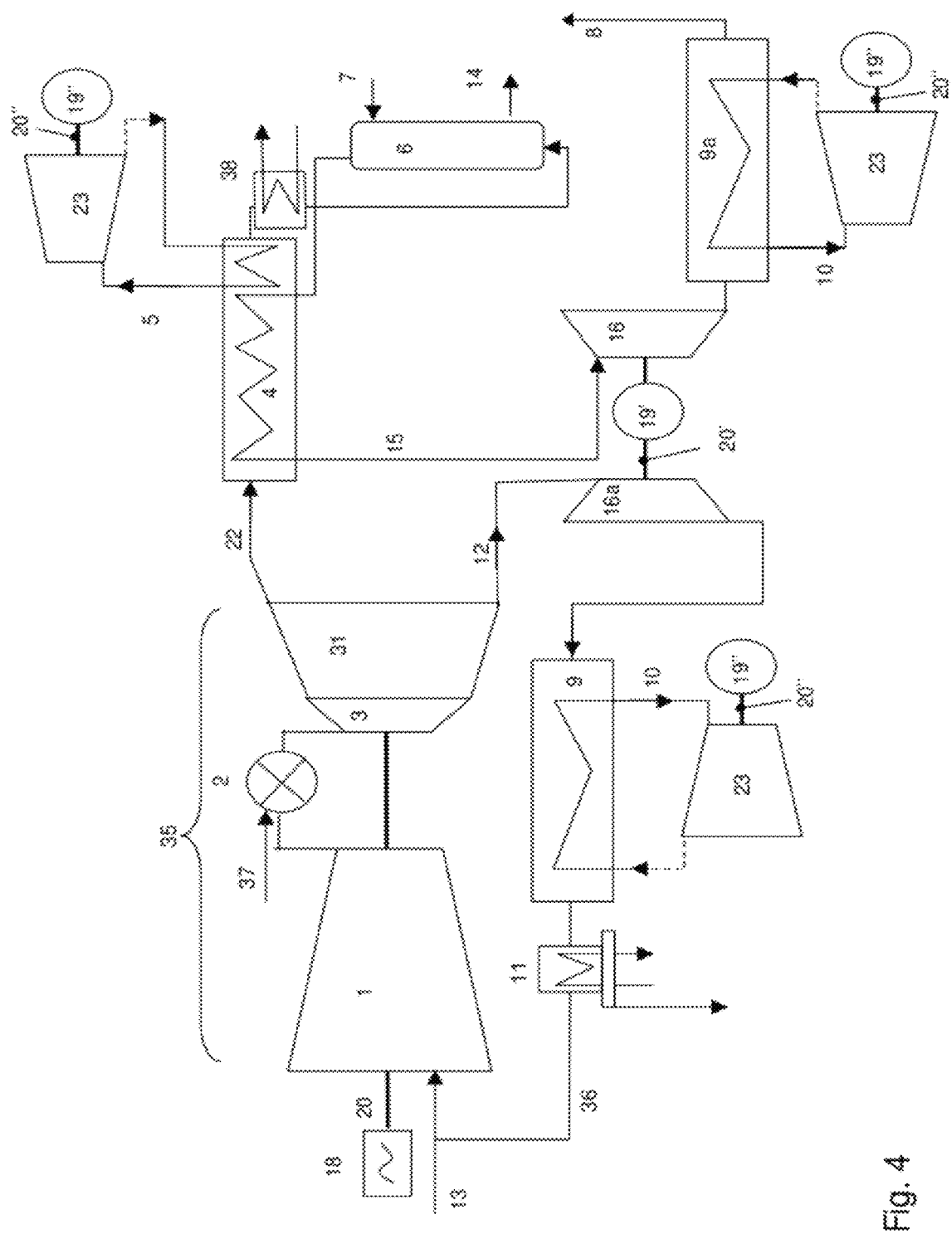
FIG. 4 shows a CCPP with flow splitting after a core turbine, recirculation of a partial exhaust-gas flow and extraction of a second partial exhaust-gas flow for backend capture, as well as reexpansion of the recirculated gases and of the exhaust gases in a separate turbine.

FIG. 4 shows a CCPP in which the gas generator is arranged separately from the power turbines. The kinetic energy of the gases emerging from the gas generator is in this arrangement converted to pressure with low losses in the diffuser 31. Downstream from this diffuser, the hot gases can be split, and can be supplied from corresponding extractions to the backend capture, and can be supplied to an air turbine 16a for reexpansion of the gases to be recirculated. The $CO_2$-depleted pressurized exhaust gases 15 downstream from the backend capture are supplied to an air turbine 16.

In the illustrated example, the air turbine 16 for expansion of the hot gases to be recirculated and the air turbine $16_a$ for expansion of the $CO_2$-depleted pressurized exhaust gases 15, which have been reheated in the HRSG/heat exchanger 4, are arranged on a common shaft 20'. They both drive a generator 19' for electricity generation. Air turbines 16, 16a, each having a generator 19', are likewise feasible on separate shaft runs.

Steam is generated in the HRSG/heat exchanger 4, which uses the waste heat from the extraction flow 22, in the HRSG 9, which uses the waste heat from the recirculation flow 12, and in the HRSG 9a, which uses the waste heat from the $CO_2$-depleted exhaust gases 8. Furthermore, steam cooling of the diffuser 31 and of the hot-gas lines to the HRSG/heat exchanger 4 and to the air turbine 16a are feasible (not shown). This steam cooling allows steam to be superheated further, in a useful form.

Since, in this arrangement, the gas turbine cannot be started via the generator 19', a separate motor 18 is provided as a starting apparatus.

Figure 5:
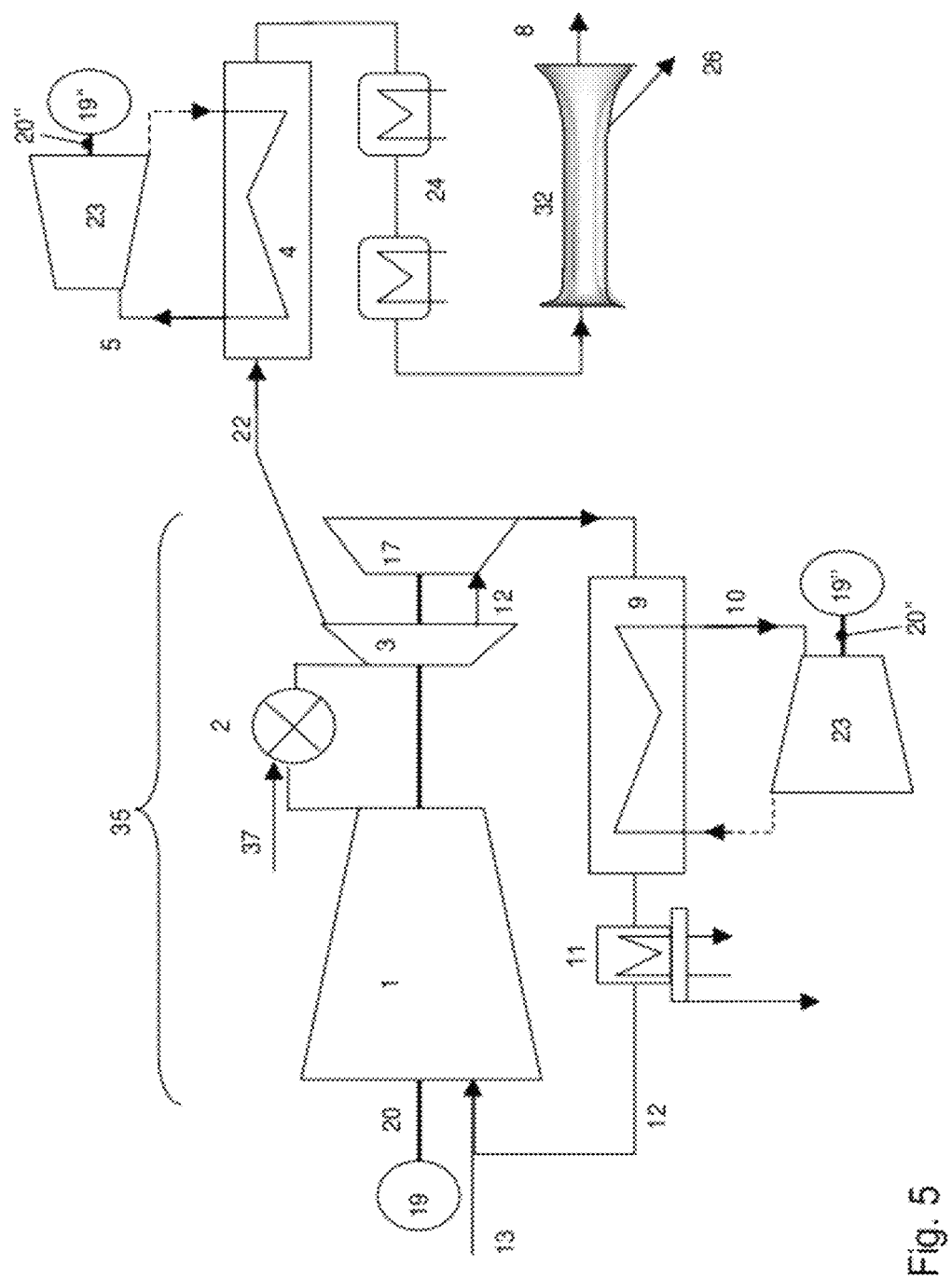
FIG. 5 shows a CCPP with a flow splitter in a single-shaft gas turbine, recirculation of a partial exhaust-gas flow and extraction of a second partial exhaust-gas flow for cryogenic backend capture by cooling and expansion of the exhaust gases in a swirl nozzle.

FIG. 5 shows a CCPP with flow splitting in a single-shaft gas turbine, recirculation of a partial exhaust-gas flow, and cryogenic backend capture from a second partial exhaust-gas flow by cooling and expansion of the exhaust gases in a swirl nozzle.

The plant shown in FIG. 5 has an arrangement which corresponds in terms of the gas turbine and treatment of the recirculation gases to FIG. 1. A first portion of the hot gases is diverted downstream from the high-pressure turbine 3 as an extraction flow 22, and a second portion is expanded in the low-pressure turbine 17 with power being output, and is recirculated after heat emission and cooling.

In comparison to the arrangement shown in FIG. 1, the arrangement shown in FIG. 5 is distinguished by cryogenic backend capture with cooling and expansion of the exhaust gases in a swirl nozzle 32. For this purpose, the extraction flow 22 emits its useable heat in the HRSG/heat exchanger 4, and is then cooled down further in the cryogenic precoolers 24. Condensation is deposited therein, and/or a periodic de-icing process must be provided.

The cold exhaust gases are supplied under pressure to a swirl nozzle 32 where the gas is greatly accelerated, and is thus cooled down further. If the precooling is adequate, the temperature falls below the sublimation temperature of $CO_2$, and $CO_2$ is precipitated. Because of the major swirl in the swirl nozzle, the $CO_2$ is concentrated by centrifugal forces on the outer walls of the nozzle, from where it is separated. The separated $CO_2$ 26 is passed on as a flow element from the swirl nozzle 32 for further processing. The $CO_2$-depleted exhaust gas 8 flows out of the outlet of the swirl nozzle, which is typically in the form of a diffuser, for pressure recovery.

Figure 6:
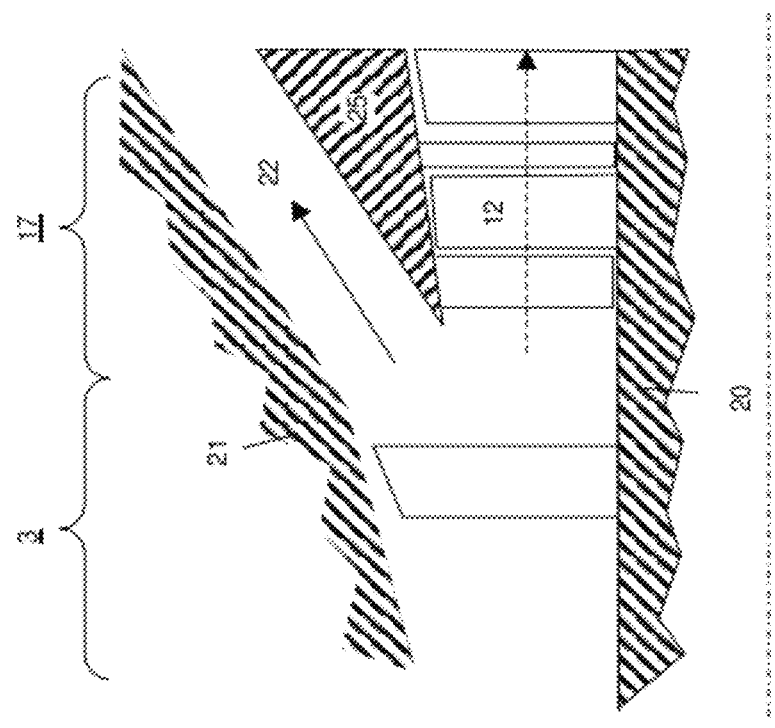
FIG. 6 shows a section through a turbine with a flow splitter between the final and the penultimate turbine stages.

FIG. 6 shows one exemplary embodiment of flow splitting upstream of the final turbine stage. The high-pressure turbine 3 and the low-pressure turbine 17 are on a common shaft 20. The recirculation flow 12 flows through the low-pressure turbine 17, which consists merely of a pair of vanes and rotating blades. The high-pressure turbine 3 is indicated only by a rotating blade. Downstream from the high-pressure turbine 3, the stator blade carrier 21 widens. There is an annular opening, through which the extraction flow 22 is diverted, between the stator blade carrier 21 and the flow splitter 25. In the illustrated example, the effective flow cross section is widened by enlarging the radius in the flow direction of the extraction flow 22, thus resulting in pressure recovery. In this example, the flow splitter 25 is a part of the stator blade carrier 21 of the low-pressure turbine 17.

Figure 7:
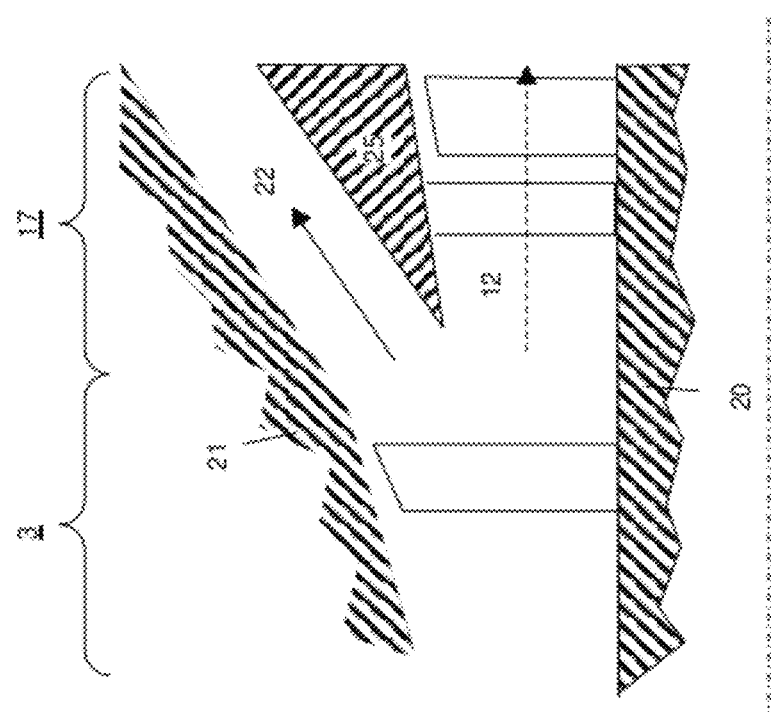
FIG. 7 shows a section through a turbine with a flow splitter before the penultimate turbine stage.

FIG. 7 shows a section, analogous to FIG. 6, through a turbine with a flow splitter 25 upstream of the penultimate turbine stage. The low-pressure turbine 17 in this example comprises two pairs of vanes and rotating blades. The high-pressure turbine 3 is indicated only by a rotating blade.

FIG. 8 shows a section analogous to FIG. 6 through a turbine with flow splitting upstream of the final turbine stage. The temperature of the hot gases in the area of the flow splitting may be very high, depending on the type of gas turbine, the location of the flow splitting and the turbine inlet temperature, and may reach the order of magnitude of 1000° C. In general it will be in the range from 600° C. to 900° C. Materials which withstand this temperature in the long term are very expensive, and air cooling is generally impracticable because of the large areas to be cooled and the losses associated with this. In order nevertheless to make it possible to use more advantageous materials for the stator blade carriers 21 and flow splitters 25, the stator blade carrier 21 and the flow splitter 25 are steam-cooled. In the illustrated example, substantially concentric cooling cavities 34 are provided which run parallel to the surface of the blade carrier. These cavities 34 are supplied with cooling steam 29, which is carried away as superheated steam 30 after flowing through the cooling cavity 34, and is supplied to the water vapor circuit. The steam is in this case passed through the cooling cavity 34 in the opposite direction to the hot-gas flow, in order to make it possible to achieve a steam temperature which is as high as possible.

Depending on the operating point of the gas turbine, a different recirculation ratio may be advantageous, that is to say the ratio of the recirculation flow 12 to the total mass flow through the turbine. One possible way to control the recirculation ratio is shown in FIG. 9. In this example, an adjusting ring 33 is arranged in the upstream edge of the flow splitter 25, in order to control the recirculation ratio. The flow cross section available for the extraction flow 22, and therefore the extraction flow 22 itself can be controlled by axial movement of the adjusting ring 33. In order to reduce the extraction flow 22, the adjusting ring 33 is moved out in the opposite direction to the flow direction of the hot gases, thus increasing the recirculation ratio. For maximum extraction, the adjusting ring 33 is moved back as far as possible in the flow splitter 25, thus reducing the recirculation ratio.

In further embodiments, ring segments are moved rather than an adjusting ring 33. Furthermore, regulation is feasible via variable-angle ring segments. For this purpose, the angle between the main flow direction of the recirculation flow 12 and the ring element is adjusted, with the ring element, or to be more precise that surface of the ring element which faces the recirculation flow 12, typically being oriented parallel to the main flow direction in this embodiment.

Instead of or in addition to regulation by a variable geometry of the flow splitter, it is possible, for example, for an air turbine 16, 16a to be provided with an inlet cross section which can be controlled. By way of example, the inlet row of vanes has an adjusting apparatus for regulating the inlet angle. From the design point of view, this is simpler than in the case of conventional gas turbines, since the inlet temperature into the air turbines 16, 16a is typically sufficiently low to provide an uncooled turbine, as a result of which no sealing problems occur at the junction points for the cooling air supply to the variable vanes.

FIG. 10 shows a single-shaft arrangement, which is symmetrical with respect to a generator 19', of the air turbine 16, in which the $CO_2$-depleted pressurized exhaust gases 15 are expanded, and the air turbine 16a, in which the recirculation flow is expanded. The two airflows are respectively introduced into the air turbines 16, 16a via a respective turbine inlet housing 27, 27a. The symmetrical arrangement on a shaft 20' makes it possible to compensate for the axial thrust of the two air turbines 16, 16a more easily.

Figure 11:
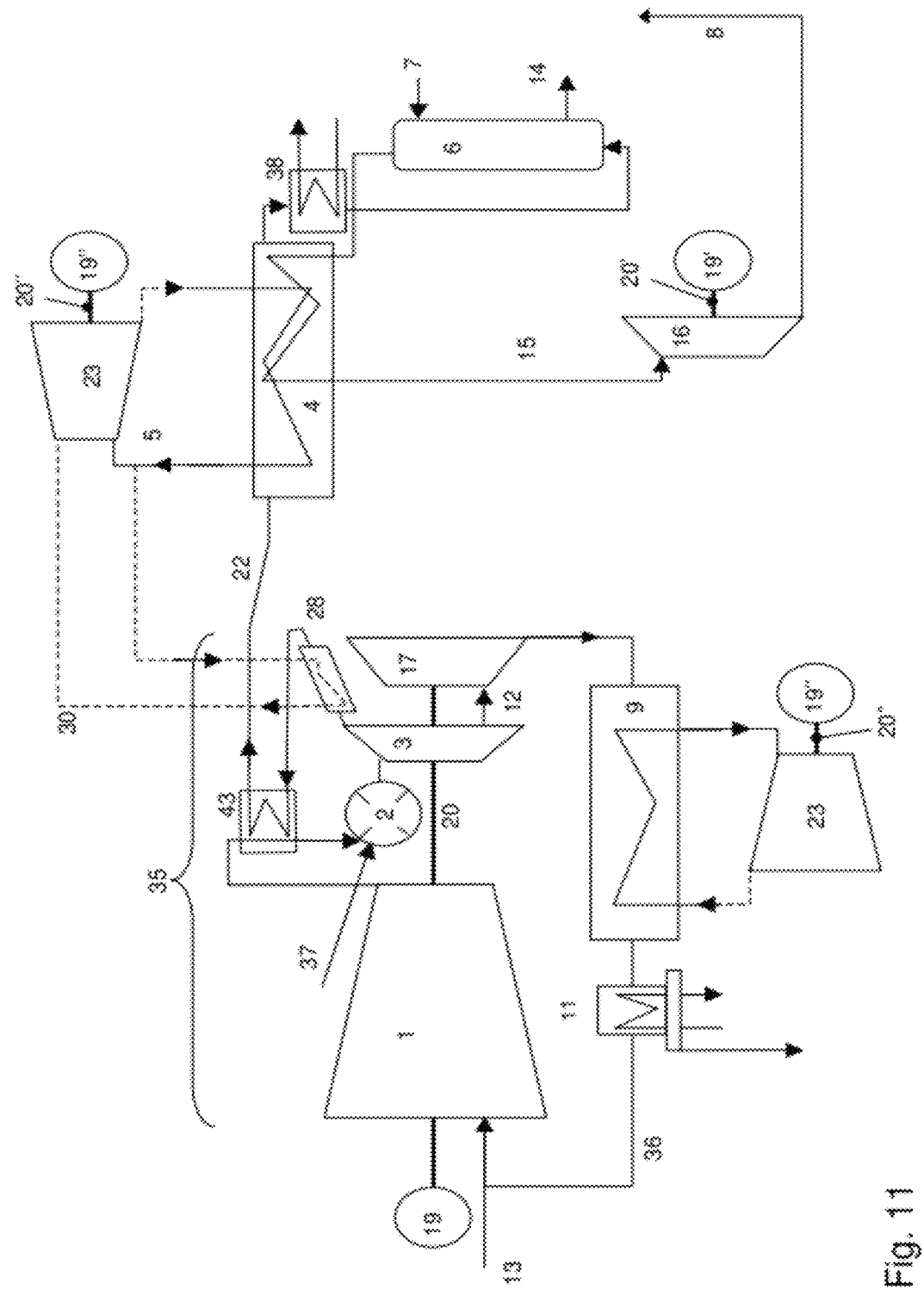
FIG. 11 shows a CCPP with a steam-cooled splitter in a single-shaft gas turbine, recirculation of a partial exhaust-gas flow, extraction of a second partial exhaust-gas flow for back-end capture and a recuperator.

FIG. 11 shows a variant of a CCPP with a recuperator 43. The variant mentioned in this example is based on FIG. 1, and shows, as an additional apparatus, a recuperator 43 by means of which the compressor outlet air is preheated before entering the combustion chamber 2. In the recuperator 43, the extraction flow 22 emits a portion of its useable heat to the compressor outlet air, as a result of which the fuel mass flow 37 can be reduced, with the turbine inlet temperature remaining constant. The residual heat in the extraction flow 22 is used analogously to the example shown in FIG. 1.

Depending on the compressor outlet temperature and the outlet temperature of the low-pressure turbine 17, recuperative heat recovery of a portion of the heat of the recirculation flow into the compressor outlet air may be advantageous.

In modern gas turbines with a high pressure ratio, the compressor outlet temperature is, however, often so high that the temperature of the recirculation flow downstream from the outlet from the low-pressure turbine 17 is no higher, or is not significantly higher, and recuperation does not result in any advantages. For these situations, recuperation as shown in FIG. 11 is advantageous, because of the higher temperature of the extraction flow 22.

In a further embodiment, a series circuit is proposed, in which the heat is first of all recuperated from the recirculation flow after emerging from the low-pressure turbine 17 into the compressor outlet air, and heat is then recuperated from the extraction flow 22 into the compressor outlet air.

The steam processes illustrated in FIGS. 1 to 5 are shown in a highly simplified form with separate steam turbines 23. The steam can also be combined and can be used for one or more steam turbines with different fresh-steam states. In this case, the at least one steam turbine 23 can drive a separate generator 19" via a separate shaft 20". However, for example, it may also be in the form of a single-shaft arrangement, and can drive a generator 19, which is shared with the gas turbine 35, via the shaft 20.

The at least one air turbine 16, 16a can likewise drive a separate generator 19" via a separate shaft 20". However, for example, it may also be arranged on the same shaft as the gas turbine 35 and/or on a shaft with at least one steam turbine 23.

Typical temperatures of the $CO_2$-depleted exhaust-gas flow 8 are in the range from the ambient temperature up to about 120° C. The lower limit is dependent mainly on the exhaust-gas composition, which can also be improved by possible filters and catalysts, the material of the exhaust-gas lines and of the chimney, as well as local conditions.

The temperature of the cooled-down recirculation flow 36 is typically in the range from 0° C. to 50° C. In the case of air/air coolers, it is generally 10° C. to 20° C. above the temperature of the ambient air. In order to optimize the efficiency for operation, in the case of constraints which differ from the design condition, it may be advantageous to control the temperature of the cooled-down recirculation flow 36. For example, the efficiency can be optimized by load-dependent temperature regulation. Particularly when on partial load, the overall efficiency of the combined-cycle power plant, can be improved by increasing the compressor inlet temperature.

The temperature of the extraction flow 22 for the design case is typically in the range from 550° C. to 750° C. on entering the HRSG/heat exchanger 4. By way of example, it is in the range from 600° C. to 700° C.

LIST OF REFERENCE SYMBOLS

1 Compressor
2 Combustion chamber
3 High-pressure turbine
4 HRSG/heat exchanger
5 Fresh steam or hot steam for the steam turbine/cogeneration
6 $CO_2$ absorber
7 $CO_2$ absorption fluid
8 $CO_2$-depleted exhaust gas
9 HRSG (waste-heat boiler)
10 Fresh steam for the steam turbine/cogeneration
11 Cooler with condensation separator
12 Recirculation flow
13 Induction air
14 $CO_2$-saturated absorber regeneration
15 $CO_2$-depleted pressurized exhaust gases for expansion
16 Air turbine
17 Low-pressure turbine
18 Motor
19 Generator (19', 19")
20 Shaft (20', 20")
21 Stator blade carrier
22 Extraction flow
23 Steam turbine
24 Cryogenic precooler
25 Flow splitter
26 Separated $CO_2$
27 Turbine inlet housing
28 Steam-cooled diffuser/lines
29 Cooling steam
30 Superheated steam
31 Diffuser
32 Swirl nozzle
33 Adjusting ring
34 Cooling cavity
35 Gas turbine
36 Cooled-down recirculation flow
37 Fuel
38 Cooler
39 Desorption column
40 $CO_2$
41 Steam for desorption
42 Heat exchanger
43 Recuperator

What is claimed is:

1. A method for $CO_2$ separation from a combined-cycle power plant, the method comprising:
   splitting a gas flow, expanded in a gas turbine, after a high-pressure turbine and upstream of a low-pressure turbine;
   expanding further a first partial mass flow of the split gas flow in the low pressure turbine and dissipating waste heat therefrom in a usable form;
   mixing induction air with the first partial mass flow after the first partial mass flow is expanded in the low pressure turbine;
   recirculating the first partial mass flow and the induction air mixed therewith into an inlet of a compressor of the gas turbine;
   diverting a second partial mass flow of the split gas flow, as an extraction flow;
   cooling the diverted second partial mass flow;
   separating $CO_2$ from the diverted second partial mass flow to form a $CO_2$ depleted mass flow; and,
   emitting the $CO_2$ depleted mass flow to an environment external to the power plant as a gas.

2. The method as claimed in claim 1, wherein the extraction flow is cooled in an HRSG or a heat exchanger the $CO_2$ is separated in a $CO_2$ absorber and the extraction flow is then expanded in an air turbine (16).

3. The method as claimed in claim 2, wherein the extraction flow is reheated in the HRSG or the heat exchanger before expansion in the air turbine.

4. The method as claimed in claim 3, wherein a stator blade carrier and/or a flow splitter are at least partially steam-cooled in a flow splitting area at which the gas flow is split.

5. The method as claimed in claim 2, wherein the extraction flow can be controlled by a variable stator blade of the air turbine.

6. The method as claimed in claim 1, comprising:
cooling the second partial mass flow in a cryogenic precooler;
accelerating the second partial mass flow precooler, is accelerated in a swirl nozzle to cryogenically separate CO2 from the second partial mass flow and to form the $CO_2$ depleted mass flow.

7. The method as claimed in claim 1, wherein the low-pressure turbine is part of a single-shaft gas turbine or, as a power turbine, part of a multishaft gas turbine.

8. The method as claimed in claim 1, wherein the first partial mass flow is expanded in a separate air turbine.

9. The method as claimed in claim 1, wherein a proportion of the extraction flow to a total mass flow of the gas turbine can be controlled by a variable geometry.

10. A combined-cycle power plant, with $CO_2$ separation, comprising:
at least one gas turbine which comprises at least one compressor, at least one combustion chamber and at least one turbine, the at least one turbine, which is arranged downstream from a last combustion chamber in the gas turbine, has flow splitting after a high-pressure turbine upstream of a low-pressure turbine in order to split the gases flowing through the at least one gas turbine downstream of the high-pressure turbine and upstream of the low-pressure turbine into an extraction flow and a recirculation flow, wherein:
the recirculation flow is expanded in the low-pressure turbine before recirculation of the recirculation flow into an inlet flow of the compressor, and
the recirculation flow is mixed with induction air to form the inlet flow that is fed into the compressor; and
the extraction flow is cooled after being diverted from the recirculation flow and $CO_2$ is separated from the cooled extraction flow to form a $CO_2$ depleted mass flow, and the $CO_2$ depleted mass flow is emitted to an environment external to the power plant.

11. The combined-cycle power plant as claimed in claim 10, wherein a flow splitter is arranged between the high-pressure turbine and the low-pressure turbine to divert the extraction flow.

12. The combined-cycle power plant as claimed in claim 11, wherein an HRSG and a cooler are provided downstream from the low-pressure turbine or an air turbine in a recirculation line through which the recirculation flow is recirculated to the compressor, and wherein an HRSG or a heat exchanger, and a $CO_2$ separator are provided in an outlet line for the extraction flow.

13. The combined-cycle power plant as claimed in claim 12, wherein an air turbine is arranged downstream from the $CO_2$ separator to expand the $CO_2$ depleted mass flow prior to the $CO_2$ depleted mass flow being emitted to the environment.

14. The combined-cycle power plant as claimed in claim 13, wherein an HRSG or a heat exchanger for cooling the extraction flow before the $CO_2$ separator and for reheating the $CO_2$-depleted mass flow is provided between the flow splitter and the $CO_2$ separator, as well as between the $CO_2$ separator and the air turbine that expands the $CO_2$ depleted mass flow.

15. The combined-cycle power plant as claimed in claim 13, wherein at least one air turbine has at least one variable row of vanes.

16. The combined-cycle power plant as claimed in claim 13, wherein the air turbine for expansion of the recirculation flow and the air turbine for expansion of the $CO_2$ depleted mass flow are arranged on one shaft.

17. The combined-cycle power plant as claimed in claim 12, wherein a cryogenic precooler and a swirl nozzle for $CO_2$ separation are arranged downstream from the HRSG or the heat exchanger in order to use waste heat from the extraction flow before $CO_2$ is separated from the extraction flow.

18. The combined-cycle power plant as claimed in claim 11, wherein the flow splitter or a diffuse and/or lines for the extraction flow and/or lines for the recirculation flow at least partially have steam cooling.

19. The combined-cycle power plant as claimed in claim 11, wherein the flow splitter has a variable geometry for regulation of the recirculation ratio.

20. The combined-cycle power plant as claimed in claim 10, wherein a diffuser is arranged downstream from the high-pressure turbine and is connected to at least two outlet lines, with at least one outlet line being provided for the extraction flow and at least one outlet line being provided for the recirculation flow to transport the recirculation flow to an air turbine.

21. The combined-cycle power plant as claimed in claim 10, wherein compressor outlet air is passed through a recuperator for preheating by heat from the extraction flow and/or from the recirculation flow before entering the last combustion chamber.

* * * * *